Dec. 29, 1931.  D. L. MAKER ET AL  1,838,951
BRAKE MECHANISM
Filed Jan. 4, 1930
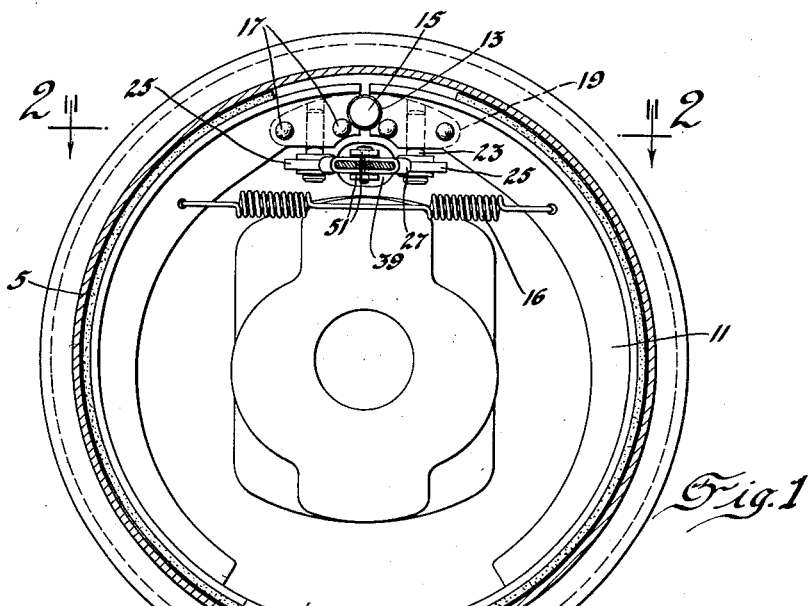
Fig.1
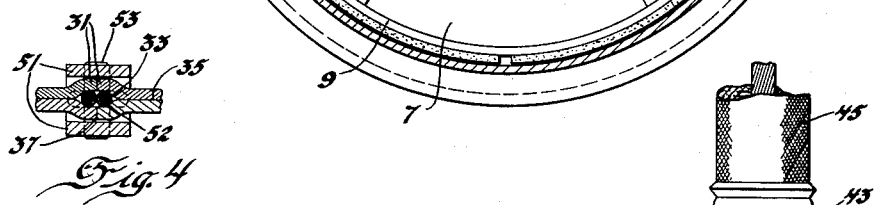
Fig.4
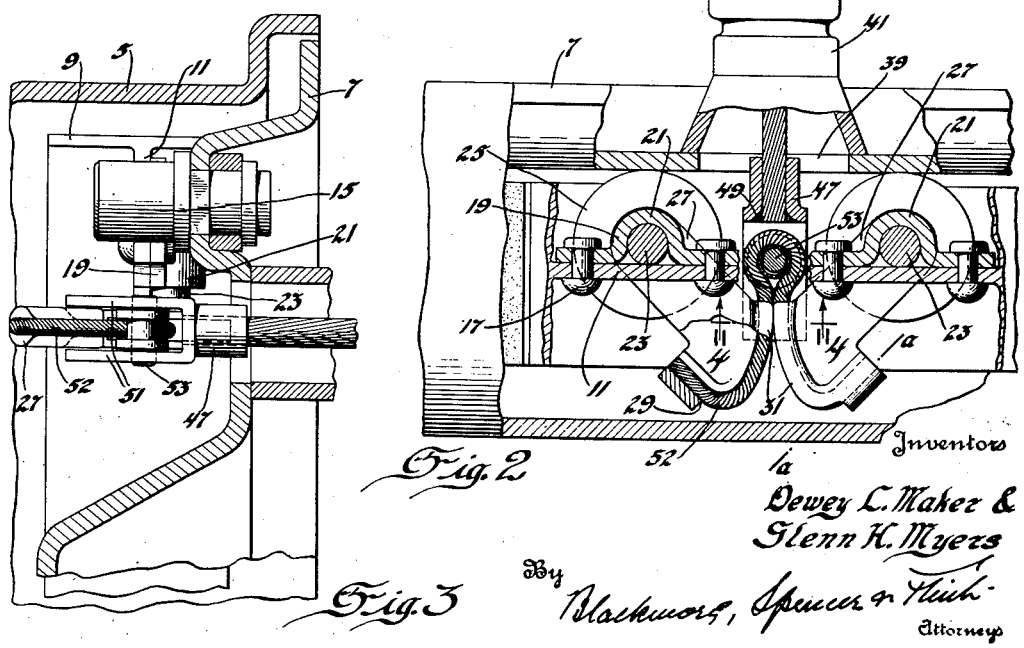
Fig.2
Fig.3
Inventors
Dewey L. Maker &
Glenn H. Myers
By Blackmore, Spencer & Hiuh
Attorneys Patented Dec. 29, 1931

1,838,951

UNITED STATES PATENT OFFICE

DEWEY L. MAKER AND GLENN H. MYERS, OF DETROIT, MICHIGAN, ASSIGNORS TO GENERAL MOTORS CORPORATION, OF DETROIT, MICHIGAN, A CORPORATION OF DELAWARE

BRAKE MECHANISM

Application filed January 4, 1930. Serial No. 418,541.

This invention relates to brakes and has been designed especially for brakes to be used on vehicle wheels.

An object of the invention is to obtain a mechanical advantage for the operating mechanism which shall not very greatly change through a wide range of movement of the brake applying mechanism.

A further object is to avoid the necessity of adjusting mechanism for the brake element which is to engage the drum carried by the wheel. Another object is to provide a construction which avoids the manufacture of separate backing plates for the right and left wheel brakes.

Economy is another object of the invention. Other objects and advantages will be understood from the following description.

In the drawings, Figure 1 is a view in elevation of a brake mechanism incorporating our improvement. Figure 2 is a sectional view substantially on line 2—2 of Figure 1. Figure 3 is a vertical section. Figure 4 is a section on line 4—4 of Figure 2.

Referring by reference characters to the drawings, numeral 5 represents a drum which is to be secured to a vehicle wheel, as is usual. 7 is a relatively fixed plate, this plate being usually designated as the backing plate. In the drawings, the operating mechanism is shown associated with an internal band brake comprising a band 9, with radial reinforcements 11. The ends of the band are provided with grooves 13 engaging a pin 15 fixed to the backing plate as shown in Figure 3. A releasing spring 16 holds the ends of the brake band in contact with the pin 15. When the ends 13 are spread apart so that the band engages the drum, the rotating drum carries the band around until one or the other of the ends anchors on the pin 15.

The band is therefore highly self-actuating and very efficient for light pedal pressure. Brakes of this kind have heretofore been actuated by a toggle linkage and this type of actuating mechanism has been adopted in my invention. Secured by suitable fastening means 17 to the reinforcing ribs 11, adjacent each band end is a strip of sheet metal 19 arched as at 21 to support a pin 23. Rotatable on the pins 23 below the clamped portion thereof are rollers 25 engaging the adjacent backing plate surface within the drum enclosure. Two toggle links 27 are also mounted at their remote ends on these pins 23. Preferably the toggle link is made from a stamping folded as along the lines a—a in Figure 2 to attain the shape therein shown. At the fold the stamping is shaped to form an opening 29 axially along the line a—a. The adjoining edges constitute cam faces as at 31, these faces being bent away from each other to form grooves 33 between the parallel faces 31. Adjacent the faces 31 the halves contact as at 35 and then are spaced from each other. The spaced ends straddle the rollers 25 and are provided with apertures to receive the pins 23. The cam faces 31 of the opposed toggle links contact with each other at a point designated as 37. The backing plate 7 has an opening 39 enclosed by a suitable fitting 41 terminating in an end 43 to which may be secured the housing 45 of a flexible cable. The cable extends away from the brake and is to be connected to any suitable operating means on the vehicle. The cable extends into the drum enclosure and is there secured to a block 47 as at 49. The block is forked as at 51 and the forks carrying a pin 53. Surrounding the pin 53 is the bight of a flexible cable 52. From the bight, the cable extends on both sides of the pin 53 along the channels of the cam links and is secured in a suitable way in the openings 29 as shown in Figure 2.

It should be observed that the lines from the center of each pin 23 to the several points along the cam surface increase for points progressively remote from the point of contact of the surfaces in the position of brake release shown in Figure 2. If the curvature of faces 31 were circular arcs with centers at 23, it will be evident that as a pull is transmitted to the operating cable the band ends would separate, the rollers would travel along the backing plate and the point of contact of the cam faces would move toward a line adjoining pins 23. Should the brake lining become worn the point of contact might reach the line adjoining the roller pivots and the links become locked. This difficulty might be and has been in some constructions avoided by providing an adjustment of one toggle lever pin relative to the band end with the result that the spacing between the two band ends might be adjusted to accommodate lining wear. Such an expedient means added expense to provide the adjustable expedient. It involves expense also because the backing plate must be apertured to afford access to the adjusting mechanism, and since it is desirable that the adjusting means at each wheel should be located in the same position relative to the applying means in a forward or rearward direction, it becomes necessary to make the backing plates in rights and lefts. Furthermore, with the conventional kind of toggle wherein the point of contact of the links approaches the line adjoining the remote ends, the mechanical advantage varies from its initial amount to infinity, a change which is obviously undesirable.

All these disadvantages are overcome by simple provisions herein described. By making the engaging faces of the links of cam shape, when the pins separate under the toggle action, successively more remote points along the cam faces come into contact. This is like employing toggles of progressively longer links. The point of contact of the cam faces may remain equally distant or may slightly approach the line of roller centers, with the result that the mechanical advantage is but little changed throughout the range of brake applying movement. The cam surface may even be so shaped that the points of contact withdraw from the line joining the roller centers sufficiently so that the lines joining the roller center and the points of contact remain parallel as the brake is applied. Under such circumstances the mechanical advantages remain substantially constant. Since the arrangement is the equivalent of the use of successive longer toggle links and in consequence the links cannot lock within the greatest possible movement required as the brake lining wears, there is no occasion to introduce the adjusting device referred to above. There is then no need for separate backing plates for the two sides of the car.

Among the merits of the invention, therefore, are the maintaining of a substantially constant mechanical advantage. Simplicity and convenience result from the omission of the adjustable device and the avoidance of the separate right and left backing plates. Economy in construction is obviously attained along with the two last named advantages.

It will be understood that other than the specific means shown and described may be adopted provided the substitution embodies the underlying principles herein set forth and defined by the claims.

We claim:

1. In combination, a brake drum, a brake member therein to frictionally engage the drum, said member having adjacent spaced ends, a toggle comprising links, the remote ends of said links pivoted to said adjacent ends of said brake member, the adjacent ends of said toggle links having engaging cam faces together with actuating means for said brake comprising a block and means carried by said block and attached to said toggle links.

2. In combination, a brake drum, a brake member therein to frictionally engage the drum, said member having adjacent spaced ends, a toggle comprising links, the remote ends of said links pivoted to said adjacent ends of said brake member, the adjacent ends of said toggle links having engaging cam faces together with actuating means for said brake comprising a block, a pin carried by said block and flexible means surrounding said pin contacting the faces of said toggle links between the region of contact and terminally secured to said links.

3. In a brake, a drum, a brake member within said drum to frictionally engage the drum and having spaced ends, toggle links having their remote ends pivoted to said brake member ends, said toggle links operable in a plane at right angles to the plane of the brake member, said toggle links having their adjacent ends shaped to create a substantially constant mechanical advantage and to prevent alinement of links and flexible operating means connected to said adjacent ends.

In testimony whereof we affix our signatures.

DEWEY L. MAKER.
GLENN H. MYERS.